United States Patent
Fujishiro et al.

(10) Patent No.: US 12,477,428 B2
(45) Date of Patent: Nov. 18, 2025

(54) COMMUNICATION CONTROL METHOD

(71) Applicant: KYOCERA Corporation, Kyoto (JP)

(72) Inventors: Masato Fujishiro, Yokohama (JP); Henry Chang, San Diego, CA (US)

(73) Assignee: KYOCERA CORPORATION, Kyoto (JP)

(*) Notice: Subject to any disclaimer, the term of this patent is extended or adjusted under 35 U.S.C. 154(b) by 400 days.

(21) Appl. No.: 17/479,651

(22) Filed: Sep. 20, 2021

(65) Prior Publication Data

US 2022/0007259 A1    Jan. 6, 2022

Related U.S. Application Data

(63) Continuation of application No. PCT/JP2020/013788, filed on Mar. 26, 2020.

(60) Provisional application No. 62/825,157, filed on Mar. 28, 2019.

(51) Int. Cl.
*H04W 36/30* (2009.01)
*H04W 76/27* (2018.01)

(52) U.S. Cl.
CPC ......... *H04W 36/305* (2018.08); *H04W 76/27* (2018.02)

(58) Field of Classification Search
CPC ........................... H04W 36/305; H04W 76/27; H04W 36/0055
See application file for complete search history.

(56) References Cited

U.S. PATENT DOCUMENTS

| | | | |
|---|---|---|---|
| 9,319,917 | B2 | 4/2016 | Tamura et al. |
| 9,872,194 | B2 | 1/2018 | Tamura et al. |
| 10,178,577 | B2 | 1/2019 | Tamura et al. |
| 10,470,071 | B2 | 11/2019 | Tamura et al. |
| 10,986,521 | B2 | 4/2021 | Tamura et al. |

(Continued)

FOREIGN PATENT DOCUMENTS

| JP | 2015-122735 A | 7/2015 |
|---|---|---|
| JP | 2018-157599 A | 10/2018 |

(Continued)

OTHER PUBLICATIONS

CATT; Fast recovery enhancements [online]; 3GPP TSG-RAN WG2 Meeting #105; R2-1900215; Feb. 25-Mar. 1, 2019; pp. 1-3; Athens, Greece.

(Continued)

*Primary Examiner* — Sulaiman Nooristany
(74) *Attorney, Agent, or Firm* — Studebaker Brackett PLLC

(57) ABSTRACT

A communication control method according to an embodiment is a method for controlling dual connectivity communication in which user equipment communicates simultaneously with a master node and a secondary node. The communication control method includes detecting, by the user equipment, deterioration of a radio link between a first base station operating as the master node and the user equipment, transmitting, by the user equipment, a first message based on the deterioration of the radio link, to a second base station operating as the secondary node, and transmitting, by the second base station having received the first message, a second message to the first base station, the second message being used to recover the dual connectivity communication.

14 Claims, 11 Drawing Sheets

(56) References Cited

U.S. PATENT DOCUMENTS

| | | | | |
|---|---|---|---|---|
| 11,083,034 | B2* | 8/2021 | Guha | H04W 76/16 |
| 2015/0133122 | A1* | 5/2015 | Chen | H04W 76/15 |
| | | | | 455/436 |
| 2015/0334765 | A1* | 11/2015 | Rahman | H04L 5/0092 |
| | | | | 370/328 |
| 2016/0269963 | A1* | 9/2016 | Nigam | H04W 72/1268 |
| 2019/0289510 | A1* | 9/2019 | Rugeland | H04W 36/0079 |
| 2020/0351968 | A1* | 11/2020 | Yilmaz | H04W 76/27 |
| 2021/0153262 | A1* | 5/2021 | Mochizuki | H04W 74/0833 |
| 2021/0204156 | A1 | 7/2021 | Tamura et al. | |
| 2021/0226688 | A1* | 7/2021 | Khoshnevisan | H04L 5/0051 |
| 2021/0377758 | A1* | 12/2021 | Fujishiro | H04W 76/10 |
| 2021/0385897 | A1* | 12/2021 | Purkayastha | H04W 36/305 |
| 2022/0007259 | A1 | 1/2022 | Fujishiro et al. | |

FOREIGN PATENT DOCUMENTS

| | | |
|---|---|---|
| JP | 2021-532673 A | 11/2021 |
| WO | 2020/034949 A1 | 2/2020 |

OTHER PUBLICATIONS

KYOCERA; Initial consideration of fast MCG link recovery [online]; 3GPP TSG-RAN WG2 #105; R2-1900917; Feb. 25-Mar. 1, 2019; pp. 1-3; Athens, Greece.

* cited by examiner

COMMUNICATION CONTROL METHOD

RELATED APPLICATIONS

The present application is a continuation based on PCT Application No. PCT/JP2020/013788, filed on Mar. 26, 2020, which claims the benefit of U.S. Provisional Patent Application No. 62/825,157 filed on Mar. 28, 2019. The content of which is incorporated by reference herein in their entirety.

TECHNICAL FIELD

The present disclosure relates to a communication control method in a mobile communication system.

BACKGROUND ART

In the related art, the 3rd Generation Partnership Project (3GPP), which is a standardization project for mobile communication systems, defines dual connectivity in which user equipment communicates simultaneously with a master node and a secondary node. In the dual connectivity, both the master node and the secondary node allocate radio resources to the user equipment, which can thus utilize high-speed, highly reliable communication.

During such dual connectivity communication, in a case where the user equipment detects deterioration of a radio link with the master node, e.g., Radio Link Failure (RLF), the dual connectivity communication ends, and the user equipment may re-establish RRC connection with another base station. However, after such deterioration of the radio link, a radio state between the user equipment and the master node can be enhanced, and thus a mechanism is desired to be introduced that enables the dual connectivity communication to be quickly restored.

SUMMARY

A communication control method according to an embodiment is a method for controlling dual connectivity communication in which user equipment communicates simultaneously with a master node and a secondary node. The communication control method includes: detecting, by the user equipment, deterioration of a radio link between a first base station operating as the master node and the user equipment; transmitting, by the user equipment, a first message based on the deterioration of the radio link, to a second base station operating as the secondary node; starting a timer in response to transmission of the first message; and performing RRC connection re-establishment processing in response to expiration of the timer.

DESCRIPTION OF EMBODIMENTS

A mobile communication system according to an embodiment will be described with reference to the drawings. In the description of the drawings, the same or similar parts are designated with the same or similar reference signs.

Mobile Communication System

First, a configuration of a mobile communication system according to an embodiment will be described. While the mobile communication system according to one embodiment is a 3GPP 5G system, Long Term Evolution (LTE) may be at least partially applied to the mobile communication system.

Figure 1:
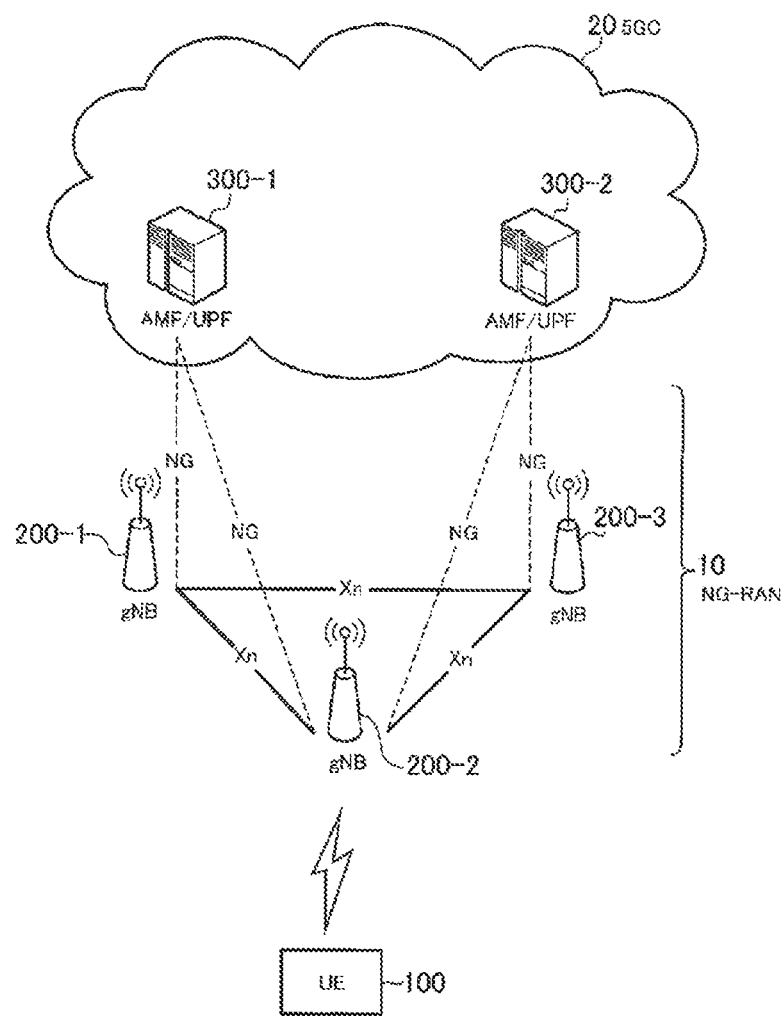
FIG. 1 is a diagram illustrating a configuration of a mobile communication system according to an embodiment.

FIG. 1 is a diagram illustrating a configuration of the mobile communication system according to an embodiment.

As illustrated in FIG. 1, the mobile communication system includes User Equipment (UE) 100, a 5G radio access network (Next Generation Radio Access Network (NG-RAN)) 10, and a 5G core network (5GC) 20.

The UE 100 is a movable apparatus. The UE 100 may be any apparatus so long as it is an apparatus utilized by a user. Examples of the UE 100 include a mobile phone terminal (including a smartphone), a tablet terminal, a notebook PC, a communication module (including a communication card or chip set), a sensor, an apparatus provided on a sensor, a vehicle, an apparatus provided on a vehicle (Vehicle UE), a flying object, and an apparatus provided on a flying object (Aerial UE).

The NG-RAN 10 includes base stations (each of which is referred to as a "gNB" in the 5G system) 200. The gNB 200 may be also referred to as an NG-RAN node. The gNBs 200 are connected to each other via an Xn interface that is an inter-base-station interface. The gNB 200 manages one or more cells. The gNB 200 performs radio communication with the UE 100 that has established connection with a cell of the gNB 200. The gNB 200 has a radio resource management (RRM) function, a user data (hereinafter simply referred to as "data") routing function, a measurement control function for mobility control and scheduling, and/or the like. A "cell" is used as a term that indicates a minimum unit of a radio communication area. A "cell" is also used as a term that indicates a function or resource that performs radio communication with the UE 100. One cell belongs to one carrier frequency.

Note that a gNB may be connected to an Evolved Packet Core (EPC) which is an LTE core network, or an LTE base station may be connected to a 5GC. Moreover, the LTE base station may be connected to the gNB via the inter-base-station interface.

The 5GC 20 includes an Access and Mobility Management Function (AMF) and a User Plane Function (UPF) 300. The AMF performs various types of mobility control for the UE 100, and the like. The AMF manages information of an area in which the UE 100 exists by communicating with the UE 100 by using Non-Access Stratum (NAS) signaling. The UPF performs data transfer control. The AMF and the UPF are connected to the gNB 200 via an NG interface which is a base station to core network interface.

Figure 2:
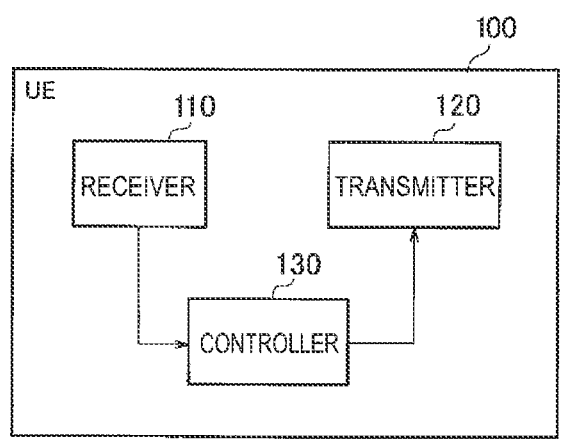
FIG. 2 is a diagram illustrating a configuration of user equipment according to an embodiment.

FIG. 2 is a diagram illustrating a configuration of the UE 100 (user equipment).

As illustrated in FIG. 2, the UE 100 includes a receiver 110, a transmitter 120, and a controller 130.

The receiver 110 performs various types of reception under control of the controller 130. The receiver 110 includes an antenna and a receiving unit. The receiving unit converts a radio signal received by the antenna into a baseband signal (reception signal) and outputs the signal to the controller 130.

The transmitter 120 performs various type of transmission under control of the controller 130. The transmitter 120 includes the antenna and a transmitting unit. The transmitting unit converts the baseband signal (transmission signal) to be output by the controller 130 into a radio signal and transmits the signal from the antenna.

The controller 130 performs various type of control in the UE 100. The controller 130 includes at least one processor and at least one memory electrically connected to the processor. The memory stores programs to be executed by the processor and information used for processing by the processor. The processor may include a baseband processor and a Central Processing Unit (CPU). The baseband processor performs modulation/demodulation and coding/decoding of the baseband signal, and the like. The CPU executes the programs stored in the memory to perform various types of processing.

Figure 3:
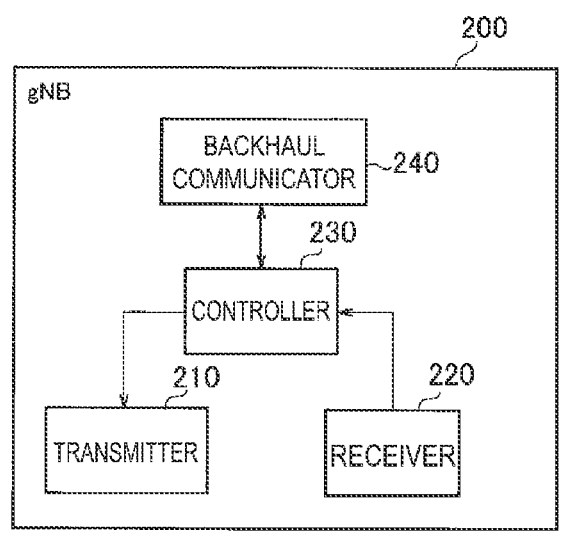
FIG. 3 is a diagram illustrating a configuration of a base station according to an embodiment.

FIG. 3 is a diagram illustrating a configuration of the gNB 200 (base station).

As illustrated in FIG. 3, the gNB 200 includes a transmitter 210, a receiver 220, a controller 230, and a backhaul communicator 240.

The transmitter 210 performs various types of transmission under control of the controller 230. The transmitter 210 includes an antenna and a transmitting unit. The transmitting unit converts a baseband signal (transmission signal) to be output by the controller 230 into a radio signal and transmits the signal from the antenna.

The receiver 220 performs various types of reception under control of the controller 230. The receiver 220 includes the antenna and a receiving unit. The receiving unit converts the radio signal received by the antenna into a baseband signal (reception signal) and outputs the signal to the controller 230.

The controller 230 performs various type of control in the gNB 200. The controller 230 includes at least one processor and at least one memory electrically connected to the processor. The memory stores programs to be executed by the processor and information used for processing by the processor. The processor may include a baseband processor and a CPU. The baseband processor performs modulation/demodulation and coding/decoding of the baseband signal, and the like. The CPU executes the programs stored in the memory to perform various types of processing.

The backhaul communicator 240 is connected to a neighboring base station via the inter-base-station interface. The backhaul communicator 240 is connected to the AMF/UPF 300 via the base station to core network interface. Note that the gNBs may include a Central Unit (CU) and a Distributed Unit (DU) (i.e., may be functionally divided), and both units may be connected to each other via an F1 interface.

Figure 4:
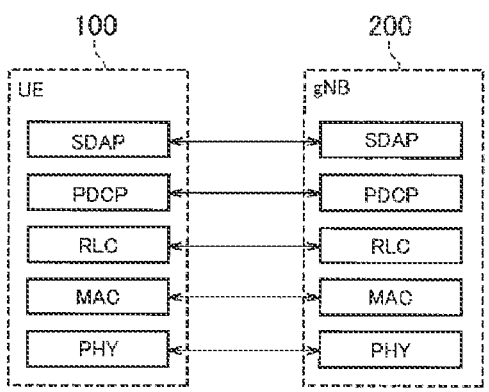
FIG. 4 is a diagram illustrating a configuration of a radio interface protocol stack in a user plane according to an embodiment.

FIG. 4 is a diagram illustrating a configuration of a radio interface protocol stack in a user plane handling data.

As illustrated in FIG. 4, the radio interface protocol in the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding/decoding, modulation/demodulation, antenna mapping/demapping, and resource mapping/demapping. Data and control information are transmitted via a physical channel between the PHY layer of the UE 100 and the PHY layer of the gNB 200.

The MAC layer performs priority control of data, retransmission processing by a hybrid ARQ (HARQ), random access procedure, and the like. Data and control information are transmitted via a transport channel between the MAC layer of the UE 100 and the MAC layer of the gNB 200. The MAC layer of the gNB 200 includes a scheduler. The scheduler determines uplink and downlink transport formats (a transport block size, and a modulation and coding scheme (MCS)) and resource blocks allocated to the UE 100.

The RLC layer transmits data to the RLC layer on the receiver side using the functions of the MAC layer and PHY layer. Data and control information are transmitted between the RLC layer of the UE 100 and the RLC layer of the gNB 200 via a logical channel.

The PDCP layer performs header compression/extension and encryption/decryption.

The SDAP layer performs mapping between an IP flow that is a unit of QoS control performed by the core network and a radio bearer that is a unit of QoS control performed by an Access Stratum (AS). Note that in a case where a RAN is connected to the EPC, the SDAP need not be provided.

Figure 5:
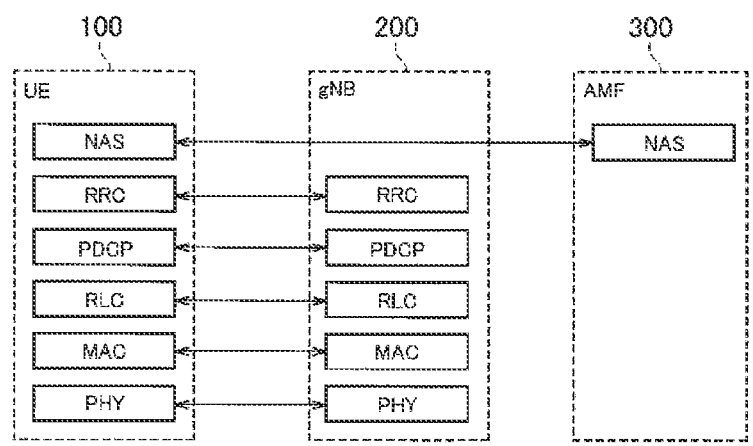
FIG. 5 is a diagram illustrating a configuration of a radio interface protocol stack in a control plane according to an embodiment.

FIG. 5 is a diagram illustrating a configuration of a radio interface protocol stack in a control plane handling signaling (control signal).

As illustrated in FIG. 5, the radio interface protocol stack in the control plane includes a Radio Resource Control (RRC) layer and a Non-Access Stratum (NAS) layer instead of the SDAP layer illustrated in FIG. 4.

RRC signaling for various types of configuration is transmitted between the RRC layer of the UE 100 and the RRC layer of the gNB 200. The RRC layer controls the logical channel, the transport channel, and the physical channel in response to establishing, re-establishing, and releasing the radio bearer. In a case where there is connection (RRC connection) between the RRC of the UE 100 and the RRC of the gNB 200, the UE 100 is in a RRC connected mode. In a case where there is no connection (RRC connection) between the RRC of the UE 100 and the RRC of the gNB 200, the UE 100 is in a RRC idle mode. In a case where the RRC connection is suspended, the UE 100 is in an RRC inactive mode.

The NAS layer located upper than the RRC layer performs session management, mobility management, and the like. NAS signaling is transmitted between the NAS layer of the UE 100 and the NAS layer of the AMF 300.

Note that the UE 100 includes an application layer or the like, in addition to the radio interface protocol.

Dual Connectivity

Figure 6:
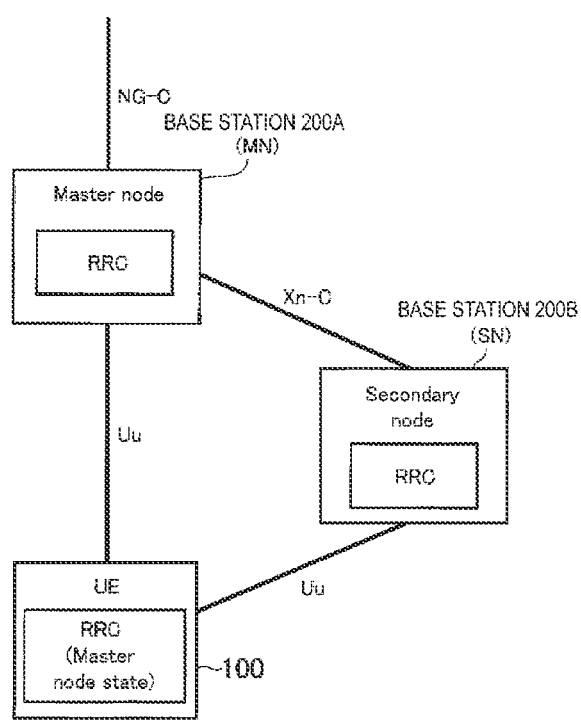
FIG. 6 is a diagram illustrating dual connectivity (DC) according to an embodiment.

Now, dual connectivity (DC) will be described in brief. DC including NR access is hereinafter mainly assumed. Such DC is sometimes referred to as Multi-RAT DC (MR-DC) or Multi-connectivity. FIG. 6 illustrates an example of DC.

As illustrated in FIG. 6, in DC, UE 100 with a plurality of transceivers is configured to utilize resources provided by two different nodes (two different base stations). One of the base stations provides NR access, and the other base station provides E-UTRA (LTE) or NR access. In the example of FIG. 6, a base station 200A is an eNB or a gNB, and a base station 200B may be an eNB or a gNB.

In addition, the one base station 200A operates as a master node (MN), and the other base station 200B operates as a secondary node (SN). MN is a radio access node that provides control plane connection to a core network. MN is sometimes referred to as a master base station. SN is a radio access node with no control plane connection to the core network. The SN is sometimes referred to as a secondary base station.

The MN and the SN are connected via a network interface (inter-base-station interface), and at least the MN is connected to the core network. In FIG. 6, an example is illustrated in which the inter-base-station interface is an Xn interface, but the inter-base-station interface may be an X2 interface. The MN and the SN transmit and receive various messages described below, to and from each other via the inter-base-station interface.

A group of serving cells used as cells for the MN and configured for the UE 100 is referred to as a master cell group (MCG). On the other hand, a group of serving cells used as cells for the SN and configured to UE 100 is referred to as a secondary cell group (SCG).

According to DC, radio resources are allocated to the UE 100 by both the MN (MCG) and the SN (SCG), and the UE 100 simultaneously communicates with the MN and the SN and can thus utilize high-speed, highly reliable communication.

The UE 100 may have a single RRC state, based on the RRC of the MN and a single control plane connection to the core network. Each of the MN and the SN includes an RRC entity that can generate an RRC Protocol Data Unit (RRC PDU) to be transmitted to the UE 100.

FIRST EMBODIMENT

Now, description will be given to operations of a mobile communication system according to a first embodiment based on such a configuration of the mobile communication system described above.

In the first embodiment, an example will be described in which, after initiation of DC communication, when deterioration of the radio link between the base station 200A and the UE 100 (hereinafter referred to as an "MCG link") is detected, the base station 200A operating as the MN can quickly restore the DC communication by controlling the UE 100 via the base station 200B operating as the SN.

Figure 7:
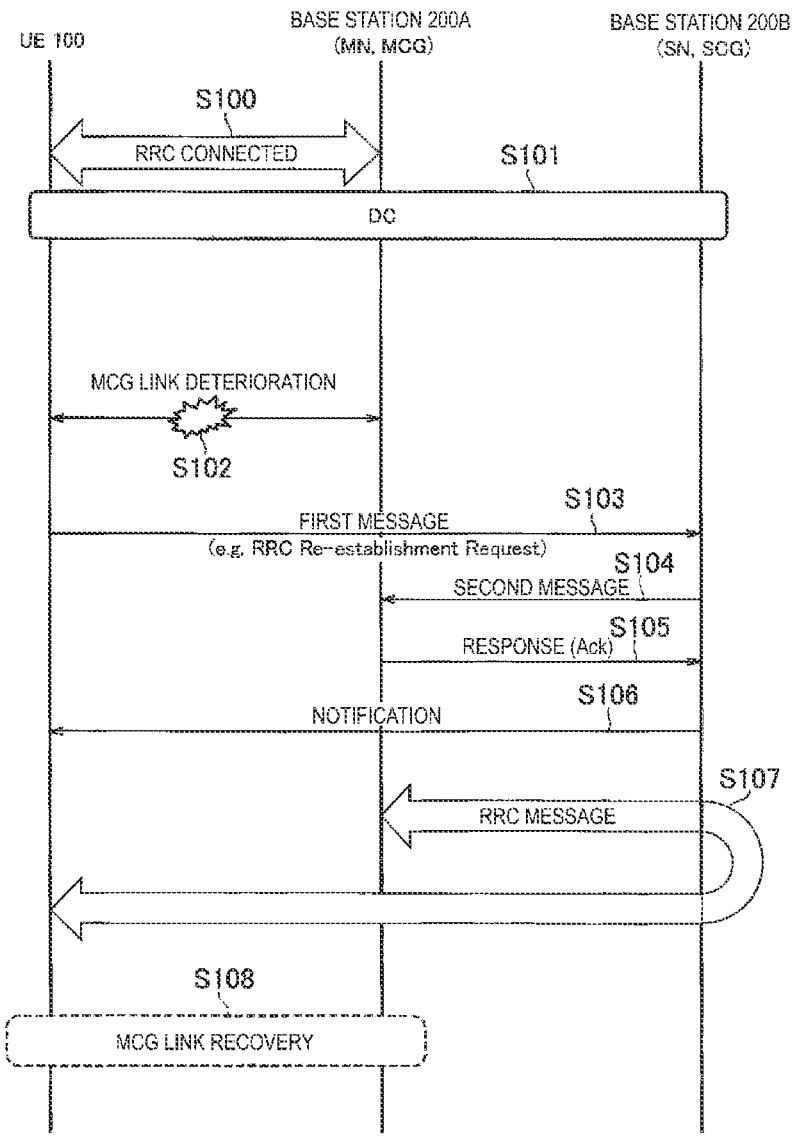
FIG. 7 is a diagram illustrating operations of a mobile communication system according to a first embodiment.

FIG. 7 is a diagram illustrating operations of a mobile communication system according to the first embodiment.

As illustrated in FIG. 7, in step S100, the UE 100 has established RRC connection to the base station 200A, and is in the RRC connected mode.

In step S101, the UE 100 initiates DC communication with the base station 200A and the base station 200B.

In this regard, the base station 200A may transmit, to the base station 200B, an addition request requesting the addition of the base station 200B for DC. In response to reception of the addition request, the base station 200B may transmit, to the base station 200A, an acknowledge (addition request Ack) to the addition request. In response to reception of the acknowledge (addition request Ack), the base station 200A may transmit, to the UE 100, an RRC message (for example, an RRC Reconfiguration message) including DC configuration information.

As a part of the DC configuration, the base station 200A may configure an operation according to the first embodiment (function to maintain the MCG via the SCG) for the UE 100 functioning to perform this operation.

The base station 200A may configure, for the UE 100, a threshold value for detecting deterioration of the MCG link. The threshold value may be different from a threshold value for defining a trigger condition for a measurement report. The threshold value may be a threshold value for a radio state and may be used to detect a sign of RLF. For example, on the assumption that RLF is detected once RLC retransmission has been performed M times, the base station 200A configures N times (M>N) as the threshold value for the UE 100. This allows the UE 100 to detect the likelihood of RLF, at an early stage, before the occurrence of RLF associated with the MCG.

As a result, the base station 200A operates as the MN, and the base station 200B operates as the SN. At least one cell of the base station 200A is configured as an MCG for the UE 100, and at least one cell of the base station 200B is configured as an SCG for the UE 100.

In step S102, the UE 100 detects deterioration of the MCG link. "Radio link" refers to radio connection in layer 2 or a lower layer.

Deterioration of the MCG link refers to occurrence of RLF or a sign of RLF. For example, the UE 100 detects RLF in a case where recovery is not achieved within a certain period of time from the occurrence of a radio problem (e.g., out-of-sync) in a physical layer or in a case where a random access procedure failure or an RLC layer failure occurs.

The sign of RLF means that, despite lack of satisfaction of a detection threshold value for RLF, failure less than the detection threshold value for RLF has occurred. For example, the sign of RLF corresponds to a prescribed number of out-of-sync occurrences at the MCG link within a certain period of time, or a prescribed number of retransmissions of a random access preamble during a random access procedure. The prescribed numbers may be configured as threshold values by the base station 200A.

Note that it is conceivable that, in a case where RLF or a sign of RLF between the base stations 200A and the UE 100 occurs, the UE 100 can detect the RLF or the sign of the RLF, whereas the base station 200A fails to detect the RLF or the sign of the RLF.

In step S103, the UE 100 transmits a first message based on the deterioration of the MCG link, to the base station 200B operating as the SN. Specifically, in response to detection of RLF associated with the base station 200A operating as the MN or a sign of the RLF, the UE 100 preferentially re-selects the base station 200B (SCG) operating as the SN. Then, the UE 100 transmits, to the base station 200B (SCG), an RRC Re-establishment Request message (first message) requesting re-establishment of RRC connection. Alternatively, the first message may be an RRC Resume Request message requesting recovery of RRC connection. Alternatively, the first message may be a message indicating a connection status of the MCG link, or may be a measurement report message. The first message may be the same as a first message according to a second embodiment described below. The UE 100 may include, in the first message, information indicating the availability of the function to perform the operation according to the first embodiment (the function to maintain the MCG via the SCG) or information indicating that the operation is desired.

In a case where the first message is a message indicating the connection status of the MCG link, then in response to detection of the sign of RLF, the UE 100 may transmit the first message to the base station 200A, as well as to the base station 200B.

In a case where the first message is an RRC Re-establishment Request message or an RRC Resume Request message, RRC connection may be established between the UE 100 and the base station 200B, based on the first message.

In this regard, in transmission of the RRC Re-establishment Request message, the UE 100 may omit the transmission of the random access preamble (Msg1) to the base station 200B and the reception of a random access response (Msg2) from the base station 200B. The UE 100 may include, in the RRC Re-establishment Request message, a Cell-Radio Network Temporary Identifier (C-RNTI) used by the SCG during DC. Specifically, the C-RNTI is allocated to the UE 100 by each of the base station 200A and the base station 200B, and the UE 100 includes, in the RRC Re-establishment Request message, the C-RNTI allocated by the base station 200B. Based on the C-RNTI included in the RRC Re-establishment Request message received from the UE 100, the base station 200B identifies the sender UE of the RRC Re-establishment Request message as the UE 100 to which the base station 200B (SN) has provided the SCG. In place of or in addition to the C-RNTI allocated by the base station 200B, the UE 100 may include, in the RRC Re-establishment Request message, a cell identifier of a primary secondary cell (PSCell) included in the SCG provided by the base station 200B (SN). The base station 200B may determine that the UE 100 having transmitted the RRC Re-establishment Request message including the C-RNTI and/or the PSCell cell identifier allocated by the base station 200B has the capability of holding the MCG link via the SCG.

In step S104, in response to reception of the first message, the base station 200B transmits, to the base station 200A, a second message used to recover the DC communication.

The second message may be a request message requesting the base station 200A to maintain the RRC connection between the base stations 200A and the UE 100 or maintain the DC state. The second message may be a notification message notifying the base station 200A that the base station 200B has received the RRC Re-establishment Request message from the UE 100. The second message may be a transfer message including, as a container, the RRC Re-establishment Request message received from the UE 100 by the base station 200B. The second message may be the same as the second message according to the second embodiment described below.

The second message includes, as information elements, the respective identifiers of the MN (base station 200A) and the SN (base station 200B) on the inter-base-station interface, and the UE identifier on the inter-base-station interface. In the first embodiment and the second embodiment below, the message transmitted and received between the base station 200A and the base station 200B are assumed to include the above-described information elements.

The second message may be a message requesting or suggesting a split Signalling Radio Bearer (SRB) or may be a message including an information element requesting or suggesting the split SRB. The split SRB refers to splitting of the SRB in the MN for transmission of the SRB by the SCG as well as by the MCG. The second message may notify the type of the SRB (SRB1, SRB2, or both) that can be accepted as the split SRB.

In step S105, in response to reception of the second message, the base station 200A transmits, to the base station 200B, a response message for the second message.

The response message may be an acknowledgment (Ack) acknowledging maintenance of the RRC connection between base stations 200A and the UE 100 or maintenance of the DC state.

The response message may be a negative acknowledgment (Nack) rejecting the maintenance of the RRC connection between base stations 200A and the UE 100 or the maintenance of the DC state. In this case, the base station 200A may transmit, to the base station 200B, a Handover Request message for handover of the UE 100 to the base station 200B.

The response message may include information (Requested Split SRBs) indicating which SRB is to be used as the split SRB.

In response to reception of the negative acknowledgment (Nack) from the base station 200A, the base station 200B may transmit, to the UE 100, the RRC Re-establishment message for the RRC Re-establishment Request message received from UE 100. Alternatively, in a case where the UE 100 has detected no RLF associated with the base station 200A, then in response to reception of the negative acknowledgment (Nack) from the base station 200A, the base station 200B may transmit, to the UE 100, a message or an information element that prompts the UE 100 to detect RLF to cause the UE 100 to perform Re-establishment. The message prompting the UE 100 to detect RLF may be an RRC Re-establishment Reject message. In response to reception of a message prompting detection of RLF, the UE 100 continues to communicate with the base station 200A (MCG), and monitors RLF.

The description below will be given on the assumption that the response message received by the base station 200B is an acknowledgment (Ack).

In step S106, in response to reception of the acknowledgment (Ack), the base station 200B transmits, to the UE 100, a message notifying that the RRC connection with the base station 200A is maintained via the base station 200B (SCG link). In this state, the RRC connection between the UE 100 and the base station 200A is not physically made via the MCG managed by the base station 200A. Thus, the UE 100 may stop monitoring RLF for the base station 200A (MCG) and other procedures (e.g., PUCCH transmission, DRX operation, and the like). However, the UE 100 measures the radio state for the base station 200A.

In step S107, with the RRC connection maintained between the UE 100 and the base station 200A, RRC messages are transmitted and received between the UE 100 and the base station 200A via the base station 200B. The RRC messages refer to messages transmitted and/or received in the RRC layer.

In this regard, the RRC message from the base station 200A to the UE 100 is transferred to the base station 200B via the inter-base-station interface and then transmitted from the base station 200B to UE 100 by an RRC container transmitted on a signaling radio bearer (SRB) 3. "SRB3" refers to a radio bearer for control established between the UE 100 and the SN.

The RRC message from UE 100 to the base station 200A is transmitted to the base station 200B by the RRC container transmitted on the SRB3, and then transferred from the base station 200B to the base station 200A via the inter-base-station interface.

The RRC container transmitted on the SRB 3 as described above may be a dedicated RRC container that can be used only when the operation according to the first embodiment (i.e., MCG connection via the SCG link) is active.

The state of step S107 may be considered to be a state in which the UE 100 has RRC connection with each of the base station 200A and the base station 200B. In this case, the RRC connection established between the UE 100 and the base station 200A may be interrupted (suspended) or deactivated. The UE 100 may be in an RRC inactive mode. Since the link state with the MCG is poor, the UE 100 can detect RLF when the UE 100 maintains the RRC connected mode. Thus, the RRC connection between the UE 100 and the base station 200A may be interrupted.

Note that the RRC of the UE 100 connected to the MCG may be a master RRC (M-RRC), and the RRC of the UE 100 connected to the SCG may be a secondary RRC (S-RRC). The M-RRC of the UE 100 may instruct selection of a cell to which the S-RRC of the UE 100 is to be connected. In this regard, the M-RRC of the UE 100 may configure a list of candidate cells for the cell to which the S-RRC is to be connected, to the S-RRC. Control is difficult in a case where the S-RRC may be connected to any cell, and thus the M-RRC of the UE 100 designates the cell to which the S-RRC of UE 100 is to be connected. For example, to obtain diversity gain, control is enabled such that the frequency of a connection destination cell is different between the M-RRC and the S-RRC or that the S-RRC is caused to select a cell different from the cell to which the M-RRC is connected.

The UE 100 may transmit a measurement report to the base station 200A by the RRC container via the base station 200B. The measurement report includes measurement results obtained by the UE 100 by measuring the radio state for each cell. A case is assumed where the base station 200A determines that the radio state between the UE 100 and the base station 200A has been enhanced, for example, based on the measurement report from the UE 100 (step S108). In this case, the base station 200A may transmit control information used to recover the DC connection (the RRC connection between the UE 100 and the base station 200), to the UE 100 by the RRC container via the base station 200B. The control information includes a contention-free random access preamble used for the random access procedure to the base station 200A, a radio configuration used for radio communication with the base station 200A, and the like.

In a case of determining that the radio state between the UE 100 and the base station 200A has been enhanced, for example (step S108), the UE 100 may transmit a message (e.g., an RRC Re-Request message) for re-requesting RRC connection, to the base station 200A via the base station 200B. The base station 200A may transmit a response message for the above-described message to the UE 100 via the base station 200B. The response message may include information indicating that the DC is recovered based on the last DC configuration information.

In step S108, the UE 100 and the base station 200A recover the MCG link. In this regard, the UE 100 may transmit a notification that the MCG link is restored, to the base station 200A by the RRC container via the base station 200B. The base station 200A may transmit a response to the notification from UE 100, directly to the UE 100 using an RRC Reconfiguration message, for example, via the MCG link. Alternatively, the base station 200A may transmit the response to the notification from UE 100, to the UE 100 by the RRC container via the base station 200B.

On the other hand, in a case where the radio state of the MCG link has not been enhanced over a certain period of time (i.e., the MCG link fails to be re-established), the base station 200A may hand over the UE 100 to the base station 200B and cause the base station 200B to take over the RRC connection. In this case, the DC is terminated, and the UE 100 communicates only with the base station 200B.

The above-described certain period of time may be configured by a timer. The base station 200A may configure a timer to the base station 200B. The base station 200B may start the timer when the first message is received from the UE 100 (step S103). The base station 200B may configure (notify) the timer for the base station 200A. The base station 200A may start the timer when receiving the second message from the base station 200B (step S104) or when transmitting an acknowledgment (Ack) (step S105). The base station 200A may configure the timer for the UE 100. The UE 100 may start the timer in response to detection of deterioration of the MCG link. In a case where the timer expires without recovery of the MCG link, the UE 100 may be automatically handed over to the base station 200B even without reception of a handover instruction from the base station 200A.

According to the first embodiment, when the deterioration of the MCG link is detected after initiation of the DC communication, the RRC messages are transmitted and/or received between the UE 100 and the base station 200A via the base station 200B with the RRC connection maintained between the UE 100 and the base station 200A. Thus, even in a case where RLF in the MCG link occurs, various types of control can be performed on the UE 100 by the base station 200A via the SCG, thus allowing the DC communication to be quickly recovered when the radio state of the MCG is enhanced.

Modification Example of First Embodiment

In the above-described first embodiment, an example has been described in which in response to detection of RLF associated with the base station 200A operating as the MN or a sign of the RLF, the UE 100 preferentially re-selects the base station 200B (SCG) operating as the SN, and transmits, to the base station 200B (SCG), the RRC Re-establishment Request message (first message) requesting re-establishment of the RRC connection.

Typically, in response to detection of RLF, the UE 100 performs a cell re-selection operation within a certain period of time to select an appropriate cell, and transmits the RRC Re-establishment Request message. Such a cell re-selection operation includes measurement of radio quality (RSRP, RSRQ, and the like) for each cell and evaluation of whether the measurement results satisfy cell selection criteria.

However, in a case where the base station 200B operates as the SN, such a cell re-selection operation is unnecessary. Thus, in response to detection of RLF associated with the base station 200A operating as the MN or a sign of the RLF, the UE 100 may omit the cell re-selection operation and transmit the RRC Re-establishment Request message to the base station 200B.

However, in a case where SCG RLF associated with the base station 200B (or a Radio problem with the SCG) has occurred when the UE 100 detects RLF associated with the base station 200A operating as the MN or a sign of the RLF, the UE 100 may perform the cell re-selection operation. On the other hand, in a case where no SCG RLF associated with the base station 200B (or no radio problem with the SCG) has occurred when the UE 100 detects RLF associated with the base station 200A operating as the MN or a sign of the RLF, the UE 100 may omit the cell re-selection operation. Note that, in a case where the cell of a base station other than the base stations 200A and 200B is re-selected through the cell re-selection operation, the DC is terminated.

In a case where a permission to omit such a cell selection operation is configured by the base station 200A or 200B, the UE 100 may perform the omission operation.

Second Embodiment

Next, operations of a mobile communication system according to a second embodiment will be described with focus placed on differences from the above-described first embodiment.

In the second embodiment, an example will be described in which in a case where deterioration of the MCG link is detected after initiation of DC communication, the roles of the MN and the SN are switched between the base station 200A and the base station 200B (hereinafter referred to as "Role Change" as appropriate) to enable the DC communication to be quickly recovered.

Figure 8:
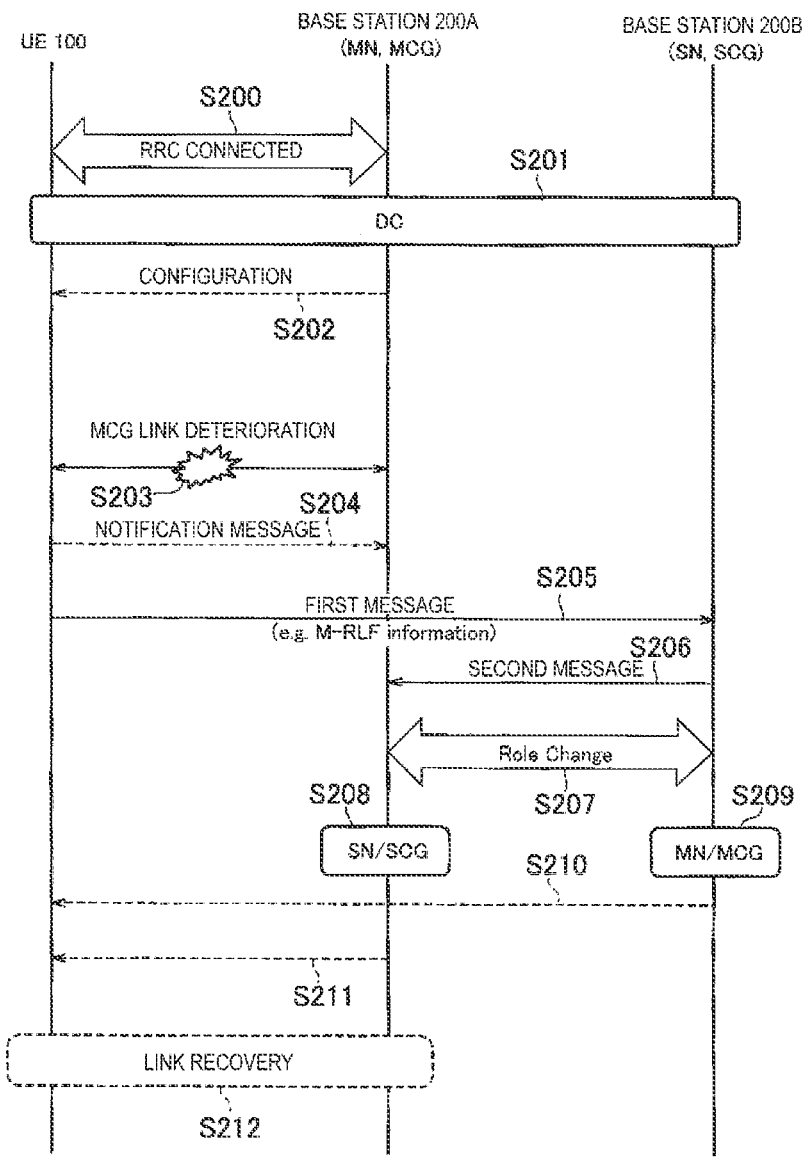
FIG. 8 is a diagram illustrating operations of a mobile communication system according to a second embodiment.

FIG. 8 is a diagram illustrating the operations of the mobile communication system according to the second embodiment.

As illustrated in FIG. 8, in step S200, the UE 100 has established RRC connection with the base station 200A, and is in the RRC connected mode.

In step S201, the UE 100 initiates DC communication with the base station 200A and the base station 200B.

In this regard, the base station 200A may transmit, to the base station 200B, an addition request requesting the addition of the base station 200B for DC. In response to reception of the addition request, the base station 200B may transmit, to the base station 200A, an acknowledge (addition request Ack) to the addition request.

In response to reception of the acknowledge (addition request Ack), the base station 200A may transmit the RRC message including the DC configuration information to the UE 100 (step S202).

As a result, the base station 200A operates as the MN, and the base station 200B operates as the SN. At least one cell of the base station 200A is configured as an MCG for the UE 100, and at least one cell of the base station 200B is configured as an SCG for the UE 100.

In step S202, the base station 200A may configure, for the UE 100, a threshold value for detecting deterioration of the MCG link. The threshold value may be different from a threshold value for defining a trigger condition for a measurement report. The threshold value may be a threshold value for a radio state and may be used to detect a sign of RLF. For example, on the assumption that RLF is detected once RLC retransmission has been performed M times, the base station 200A configures N times (M>N) as the threshold value for the UE 100. This allows the UE 100 to detect the likelihood of RLF, at an early stage, before the occurrence of RLF associated with the MCG.

In step S202, the base station 200A may transmit, to the UE 100 in advance, configuration information to be used after the Role Change. Specifically, the base station 200A transmits a plurality of RRC configurations to the UE 100. Of these RRC configurations, a first RRC configuration is configuration information to be immediately used for the MCG link, and is activated when configured for the UE 100. Of these RRC configurations, at least one second RRC configuration is configuration information to be used after the Role Change, and is in a standby state (inactive) when configured for the UE 100.

The base station 200A may include a plurality of RRC configurations in one RRC Reconfiguration message and collectively transmit the plurality of RRC configurations to the UE 100. Alternatively, the base station 200A may first transmit the first RRC configuration to the UE 100, and then additionally transmit the second RRC configuration to the UE 100. The base station 200A may specify and delete any of the plurality of RRC configurations for the UE 100. Each of the plurality of RRC configurations may be linked with a cell identifier. The base station 200A may transmit a plurality of sets of an RRC configuration and a cell identifier to the UE 100. For example, by activating the corresponding RRC configuration, the UE 100 uses the appropriate RRC configuration for each cell used for the MCG.

In step S203, the UE 100 detects deterioration of the MCG link.

As described above, the deterioration of the MCG link refers to the occurrence of RLF or a sign of the RLF. For example, the UE 100 detects RLF in a case where recovery is not achieved within a certain period of time from the occurrence of a radio problem (e.g., out-of-sync) in a physical layer or in a case where a random access procedure failure or an RLC layer failure occurs.

The sign of RLF means that, despite lack of satisfaction of the detection threshold value for RLF, failure less than the detection threshold value for RLF has occurred. For example, the sign of RLF corresponds to a prescribed number of out-of-sync occurrences at the MCG link within a certain period of time, or a prescribed number of retransmissions of a random access preamble during a random access procedure. The prescribed numbers may be configured as threshold values by the base station 200A.

Note that it is conceivable that, in a case where RLF or a sign of RLF between the base stations 200A and the UE 100 occurs, the UE 100 can detect the RLF or the sign of the RLF, whereas the base station 200A fails to detect the RLF or the sign of the RLF.

In step S204, in response to detection of the sign of the RLF, the UE 100 may transmit, to the base station 200A, a message notifying the likelihood of the RLF. The message may be different from the measurement report or may be a request message requesting Role Change. The UE 100 may transmit the message to the base station 200A by using the SRB (SRB1) linked with a MAC entity for the MCG. The base station 200A may perform Role Change (step S207), based on reception of a message notifying the likelihood of RLF.

In step S205, the UE 100 transmits the first message based on the deterioration of the MCG link, to the base station 200B operating as the SN. In response to detection of the sign of the RLF, the UE 100 may transmit the message to the base station 200A in step S204, and transmit the first message to the base station 200B in step S205.

The first message may be a message indicating that the UE 100 has detected RLF associated with the base station 200A (MCG link) or a sign of the RLF. Such a message may be referred to as an M-RLF information message. The first message may be a measurement report message. The UE 100 transmits the M-RLF information message or the measurement report message to the base station 200B by using the SRB (SRB3) linked with the MAC entity for the SCG.

The first message may include at least one of an information element indicating the type of failure (one of T310 expiration, random access failure, and RLC retransmission upper limit arrival) or an information element indicating a measurement result for the radio state.

In step S206, the base station 200B transmits the second message to the base station 200A, based on the first message received from UE 100.

The second message may be a notification message indicating that RLF in the MCG link or a sign of the RLF has been detected, or may be a request message requesting that the base station 200B become as the MN.

The second message may include at least one of PDCP Change Indication that is an information element indicating whether PDCP data recovery is necessary, or a container for carrying an RRC information element.

In step S207, the base station 200A and base station 200B perform Role Change.

In a case where the second message is a request message (Role Change request message) requesting that the base station 200B become as the MN, then in step S207, the base station 200A may transmit a response message (Ack or Nack) for the Role Change request message, to the base station 200B.

Alternatively, in step S207, the base station 200A may transmit the Role Change request message to the base station 200B, based on the message received from UE 100 in step S204 or the second message received from the base station 200B in step S206. The Role Change request message may include various kinds of configuration information required for the base station 200B to become the MN. In response to reception of the Role Change request message, the base station 200B may transmit a response message (Ack or Nack) for the Role Change request message to the base station 200A.

As a result, the base station 200A is changed to the SN (step S208), and the base station 200B is changed to the MN (step S209).

At least one of the base station 200A or the base station 200B may transmit, to the UE 100, a message indicating that Role Change has been performed (step S210, step S211). The message indicating that Role Change has been performed may include at least either the cell identifiers of the cells included in a new MCG or the cell identifiers of the cells included in the SCG.

The UE 100 confirms that Role Change has been performed, based on the message received in step S210 and/or step S211.

The UE 100, having confirmed that Role Change has been performed, is assumed to have received a plurality of RRC configurations (the first RRC configuration and the second RRC configuration) from the base station 200A in step S202. In this case, the UE 100 activates the second RRC configuration having been on standby, and initiates application of the second RRC configuration. In addition, a plurality of second RRC configurations may be present, and each of the second RRC configurations may be linked with a cell identifier. In this case, the UE 100 may activate one of the plurality of second RRC configurations that has been linked with the cell identifier of the cell having newly belonged to the MCG, and may discard the other second RRC configurations or hold the other second RRC configurations in a standby state. Whether the UE 100 discards or holds the other second RRC configurations may be determined by a configuration provided by the base station 200A (step S202).

Note that the UE 100 may activate the second RRC configuration having been on standby, using, as a trigger, a condition different from the reception of the message in step S210 and/or step S211. For example, the UE 100 may activate the second RRC configuration having been on standby, using, as a trigger, transmission of the message in step S204 or transmission of the message in step S205.

When the radio state of the base station 200A operating as the SN is enhanced (step S212), the UE 100 can transmit and receive data to and from the base station 200A. On the other hand, in a case where the radio state of the base station 200A is not enhanced for a certain period of time, the base station 200B operating as the MN transmits a release message to the base station 200A. Thus, the base station 200B operating as the MN may release the base station 200A operating as the SN. In this case, the DC is terminated, and the UE 100 communicates only with the base station 200B. The method for configuring the certain period of time is similar to that in the first embodiment.

According to the second embodiment, in a case where deterioration of the link of the base station 200A is detected after initiation of DC communication, the roles of the MN and the SN are switched between the base station 200A and the base station 200B. Accordingly, the base station 200B newly operating as the MN can control the UE 100 with the base station 200A being maintained as the SN. Thus, the DC communication can be quickly recovered in a case where the radio state of the base station 200A is enhanced.

Modification Example of First and Second Embodiments

In the first and second embodiments described above, an example has been described in which in a case of a prescribed number of out-of-sync occurrences at the MCG link within a certain period of time or a prescribed number of retransmissions of the random access preamble during the random access procedure, the UE 100 detects a sign of RLF in the MCG link and transmits, to the base station 200B, the first message for notifying the sign of the RLF in the MCG link. In the present modification example, a specific example of such an operation will be described.

Figure 9A:
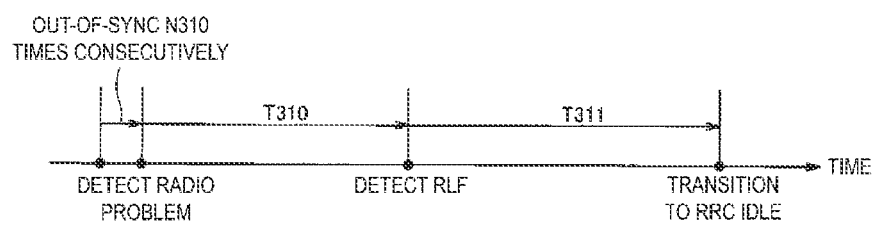
FIG. 9A is a diagram illustrating general operations of user equipment associated with RLF.

First, general operations of the UE 100 associated with RLF will be described. As illustrated in FIG. 9A, the UE 100 detects a radio problem in response to detection of the out-of-sync state (out-of-sync) N310 times consecutively. In response to detection of the radio problem, the UE 100 starts a predetermined timer T310. The UE 100 starts the timer T310, and stops the timer T310 in response to detection of an in-sync state (in-sync) N311 times consecutively. When the timer T310 expires, the UE 100 detects RLF, and starts the timer T311 and also initiates the cell re-selection operation (connection re-establishment processing). Then, when the timer T311 expires without successful connection re-establishment, the UE 100 transitions to the RRC idle mode.

Figure 9B:
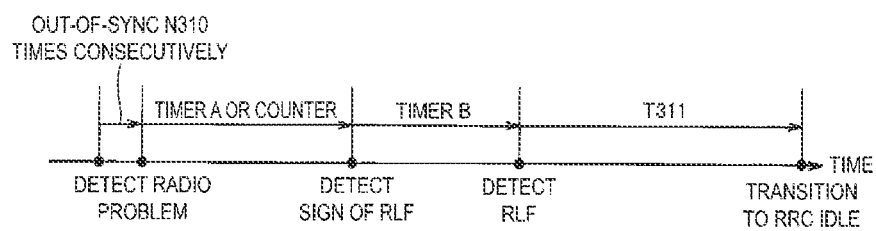
FIG. 9B is a diagram illustrating operations of UE according to a modification example of the first and second embodiments.

Now, operations according to the present modification example will be described. As illustrated in FIG. 9B, the UE 100 detects a radio problem in response to detection of the out-of-sync state (out-of-sync) N310 times consecutively. In response to detection of a radio problem, the UE 100 starts a timer A or a counter for detecting a sign of RLF. The value of the timer A is smaller than the value of the timer T310.

In a case where the timer A is used, the UE 100 detects a sign of MCG RLF when the timer A expires, and transmits the first message described above to the base station 200B.

In a case where the counter is used, the UE 100 increments the counter each time a radio problem is detected, detects a sign of MCG RLF when the counter value reaches a threshold value, and transmits the first message described above to the base station 200B. The UE 100 detects one radio problem in response to detection of the out-of-sync state (out-of-sync) N310 times consecutively. Then, in a case of detecting the in-sync state (in-sync) N311 times consecutively (the timer T310 stops), and then detecting the out-of-sync state (out-of-sync) N310 times consecutively, the UE 100 detects a radio problem once again. In this way, the UE 100 increments the counter value. The UE 100 may reset the counter value in a case where no radio problem has occurred for a certain period of time. A threshold value for the counter value may be appropriately configured.

Alternatively, the counter may be a counter that counts the out-of-sync state (out-of-sync). The threshold value for the counter may be greater than or less than the value of N310. The UE 100 may reset this counter value in response to detection of the in-sync state (in-sync). It is assumed that Tout is the period at which the UE 100 detects the out-of-sync state (out-of-sync) and that Tin is the period at which the UE 100 detects the in-sync state (in-sync) and that each of Tout and Tin is a certain time. In this case, a threshold value Nout for the counter counting the out-of-sync state as described above may be configured to satisfy Nout×Tout<N311×Tin. In a case where this formula is satisfied, the UE 100 can detect a sign of RLF before the in-sync state (in-sync) is detected N311 times consecutively, i.e., before the timer T310 expires. The UE 100 may start counting of the out-of-sync state (out-of-sync) at a timing corresponding to the first detection of the N310 detections of the out-of-sync state, which corresponds to the condition for detection of a radio problem in FIG. 9A and FIG. 9B.

Note that the value (threshold value) for the timer A and the threshold value for the counter may be configured for the UE 100 by the base station 200A or 200B. The value of the period of time during which no radio problem occurs (the "certain period of time" described above) may be configured for the UE 100 by the base station 200A or 200B. The UE 100 may combine the timer A and the counter to detect a sign of MCG RLF.

In a case of detecting a sign of RLF and transmitting the first message described above to the base station 200B, the UE 100 starts the timer B. The UE 100 suspends the initiation of RLF detection or connection re-establishment processing (RRC Reestablishment procedure) while the timer B is in operation. When the UE 100 transmits the first message to the base station 200B, a network (base stations 200A and 200B) side performs operations as described above in the first and second embodiments, and as a result, the network may transmit an instruction to the UE 100. The UE 100 suspends the initiation of RLF detection or connection re-establishment processing while the timer B is in operation, and thus can wait for the instruction from the network side.

The UE 100 may stop the timer B in response to reception of an instruction from the network side while the timer B is in operation. Even in a case where the timer T310 expires while the timer B is in operation, the UE 100 detects no RLF and does not perform the connection re-establishment processing.

When the timer B expires, the UE 100 performs the suspended operation. In other words, the UE 100 detects RLF and initiates the connection re-establishment processing.

Note that the value (threshold value) for the timer B may be configured for the UE 100 by the base station 200A or the 200B.

In the present modification example, an example has been described in which the timer B operates in parallel with the timer T310. However, the need for the timer B may be eliminated by partially changing the handling of the timer T310 and resetting (restarting) the timer T310 when the first message is transmitted in response to detection of a sign of RLF.

OTHER EMBODIMENTS

In the first and second embodiments and the modification example of the embodiments described above, the UE 100 may transmit the first message described above by using the Split SRB1. The Split SRB1 refers to a signaling radio bearer that splits at the base station 200A, and involves interposition of the base station 200B between the base stations 200A and the UE 100. Alternatively, the UE 100 may transmit the above-described first message by using the SRB3. In this case, the base station 200B operating as the SN may be responsible for control of the UE 100, or the control may be based on instructions from the MN (base station 200A) via the Xn interface.

In the first and second embodiments and the modification example of the embodiments described above, in response to reception of the first message described above, the base station 200A or 200B may transmit a handover instruction to the UE 100. The handover instruction may be an instruction for conditional handover.

At least some of the operations according to the first embodiment and at least some of the operations according to the second embodiment may be performed in combination.

In another embodiment, at least some of the operations according to the first embodiment and at least some of the operations according to the second embodiment may be applied to carrier aggregation (CA). In a case where the operations are applied to CA, the MN and the MCG are read as a primary cell (PCell), and the SN and the SCG are read as a secondary cell (SCell).

In another embodiment, the UE 100 may perform DC communication with the base stations and other pieces of UE. Specifically, the UE 100 communicates simultaneously with the base stations and other pieces of UE via a Uu interface with the base stations and a PC5 interface (sidelink) with other pieces of UE. Under such an assumption, the above-described M-RRC may be used as RRC for the base stations (Uu), and the above-described S-RRC may be used as RRC for other pieces of UE (PC5).

Note that a program may be provided that causes a computer to execute each step of processing performed by the UE 100 or the gNB 200. The program may be recorded in a computer readable medium. Use of a computer readable medium enables the program to be installed on a computer. Here, the computer readable medium on which the program is recorded may be a non-transitory recording medium. The non-transitory recording medium is not particularly limited, and may be, for example, a recording medium such as a CD-ROM, a DVD-ROM, or the like.

Circuits for performing the processing operations performed by the UE 100 or the gNB 200 may be integrated to configure at least a portion of the UE 100 or the gNB 200 as a semiconductor integrated circuit (chip set, SoC).

An embodiment has been described above in detail with reference to the drawings; however, specific configurations are not limited to those described above, and various design modifications can be made without departing from the gist of the present disclosure.

Supplementary Note 1

Introduction

The RAN plenary has approved a work item for expansion of multi-RAT dual connectivity and carrier aggregation. One purpose of the work item is to support a quick recovery mechanism for the MCG link.

Quick Recovery: Support to quick recovery of the MCG link, for example, the SCG link and the split SRB are utilized to support recovery from MCG failure in operation with MR-DC (multi-RAT dual connectivity).

Discussion

In this note, the solution direction of the quick recovery of the MCG link is discussed.

Dual connectivity utilizes radio resources served by two nodes (e.g., eNB and/or gNB). The master node provides the MCG link to the UE and provides control plane connection to the core network. On the other hand, the secondary node provides the SCG link to the UE. For example, advantages obtained from site diversity and frequency diversity are expected to enhance connection stability as well as user throughput for the multiple links, that is, the MCG and the SCG.

In the current specifications, RLF is declared separately for the MCG and the SCG, and the UE initiates the RRC re-establishment procedure in a case of MCG RLF, while simply suspending the transmission of the SCG in a case of SCG RLF. In other words, the existing dual connectivity contributes to robustness in a case of SCG failure, but provides no advantages in a case of MCG failure. In other words, there is no difference between single connectivity and dual connectivity in terms of the stability of the MCG link. The MCG link is a micro cell in dual connectivity and is thus assumed to be always stable. The SCG link is a small cell link and may thus be assumed to be uncertain. However, in execution, such assumptions are not always correct. For example, when the user enters a building, an indoor small cell provides more stable connection than that provided by an outdoor micro cell. The WID illustrates a solution to quick recover from MCG failure, in which "the SCG link and the split SRB are utilized for recovery from MCG failure in operation with MR-DC". Accordingly, a method for using an SCG resource for dual connectivity is one purpose of the work item.

Proposition 1: The RAN2 should introduce quick recovery from MCG failure by utilizing the SCG link or the split SRB.

Figure 10:
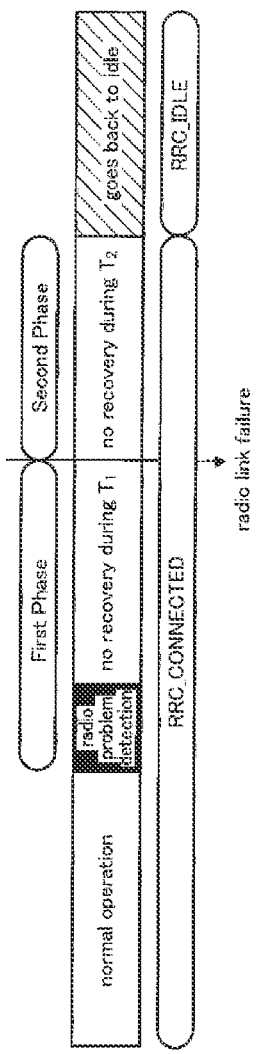
FIG. 10 is a diagram related to a supplementary note.

In a case where Proposition 1 is agreed with, a procedure related to RLF is a candidate to be extended for quick recovery. In the current specifications, after RLF is declared, the UE selects a suitable cell and initiates the RRC re-establishment procedure. Accordingly, modeling is very similar to modeling indicated in LTE. FIG. 10 is a diagram of an example of a RLF peripheral procedure in LTE. When the cell receives an RRC re-establishment request, the UE context has already been acquired or taken back, and the RRC re-establishment request is granted in order to keep the UE RRC-connected. In view of the possibility of utilizing the SCG link, the RAN2 should utilize the SCG link to quickly recover the MCG link.

Proposition 2: The RAN2 should extend a procedure related to MCG RLF in dual connectivity when the SCG link is in a good condition.

In a case where Proposition 2 is agreed with, several solutions as described below are considered.

Option 1: UE Based Quick Recovery (Reactive Recovery)

Option 1 will be studied as an extension of the RRC re-establishment procedure. For example, because the SN is expected to still have high radio link quality and to already have the UE context, in a case of MCG RLF, the UE in dual connectivity prioritizes the current SCG in the cell re-selection for the RRC re-establishment request. This may minimize a delay involved in the RRC re-establishment and random access procedure and allow the first MCG to control the UE.

Option 2: NW Based Quick Recovery (Active Recovery)

As is the case with the discussion in LTE feMOB, Option 2 will be studied as a type of role change between the MN (master node) and the SN (secondary node). For example, in a case where RLF occurs in the MCG link, the role of the MCG is replaced with the role of the current SCG link. Thus, MCG failure is expected to be avoided in advance, and a delay associated with the random access procedure may also be avoided. The UE is assumed to notify the SN of the likelihood of MCG RLF via the SRB3, and the SN properly controls the UE.

Option 3: Recovery Based on Mixture of Option 1 and Option 2

Even after the active recovery fails, the reactive recovery is implemented. Thus, even in a case where Option 1 and Option 2 are independently supported, the overall robustness is enhanced.

Option 1 is a simple solution. Option 2 is slightly more complex than Option 1, but can potentially eliminate interruption time for all services. Option 3 is discussed in the later stage after Option 1 and Option 2 have been established.

Proposition 3: The RAN2 should discuss an option for UE based reactive recovery and/or NW based active recovery for MCG RLF.

Supplementary Note 2

Introduction

The RAN plenary has approved a work item for expansion of multi-RAT dual connectivity and carrier aggregation. The RAN2 #105 made an initial discussion of quick recovery of an MCG link and reached the following agreement.
1. MCG failure may be notified to the network via the SCG. Notification via the SCell needs to be further studied.
2. It is necessary to further study how the failure is indicated, which SRB is to be used, and which failure case corresponds to quick MCG failure recovery.
3. A unified solution is intended to be provided for failure cases to be dealt with.

In a discussion of emails, failure cases and details such as an SRB for signaling for quick MCG link recovery were extensively discussed.

In this note, in addition to emails, other aspects of the unified solution to quick MCG link recovery are also discussed.

Discussion

For most failures, the procedure associated with RLF will be a candidate for enhancement of the unified quick recovery solution. In the current specifications, after RLF is declared, the UE selects a suitable cell and initiates the RRC re-establishment procedure. Accordingly, modeling is very similar to modeling indicated in LTE. FIG. 10 is a diagram of an example of a RLF peripheral procedure in LTE. A first phase (T1) basically corresponds to recovery within a cell, and a second phase (T2) primarily corresponds to recovery between cells. When the cell receives an RRC re-establishment request, the UE context has already been acquired or taken back, and the RRC re-establishment request is granted in order to keep the UE in the RRC connected mode. In view of the possibility of utilizing the SCG link, the RAN2 should utilize the SCG link to quickly recover the MCG link.

Proposition 1: On the assumption that the SCG link is still in good condition, the RAN2 should extend the procedure of recovery between cells after MCG RLF (i.e., T2 in FIG. 10).

Option 1: UE Based Quick Recovery

Option 1 will be studied as an extension of the RRC re-establishment procedure. For example, because the SN is expected to still have high radio link quality and to already have the UE context, in a case of MCG RLF, the UE in dual connectivity prioritizes the current SCG in the cell re-selection for the RRC re-establishment request. This may minimize a delay involved in the RRC re-establishment and random access procedure and allow the first MCG to control the UE.

Option 2: NW Based Quick Recovery

As is the case with the discussion of the solution of LTE feMOB or SRBx, Option 2 will be studied as a type of role change between the MN (master node) and the SN (secondary node). For example, before RLF occurs in the MCG link, the role of the MCG is replaced with the current SCG link. This may potentially avoid, compared to existing handover, a delay associated with the random access procedure. MCG failure is expected to be indicated via the SRB3 or Split SRB1 (in a case where the Split SRB1 is configured).

Option 3: Recovery Based on Mixture of Option 1 and Option 2

Even after the active recovery fails, the reactive recovery is implemented. Thus, even in a case where Option 1 and Option 2 are independently supported, the overall robustness is enhanced. Note that Option 3 may be adapted to various failure cases and is thus consistent with the "Unified Solution" agreed with in the RAN2.

Proposition 2: the RAN2 should discuss an option for UE based recovery and/or NW based recovery for MCG RLF.

In a case where Proposition 2 can be agreed with, whether the random access procedure can be skipped during the recovery procedure should be clarified as a common aspect between options. Regardless of the options, the expected results of the recovery procedure will include establishment of new MCG connection to the old SCG within the minimum service interruption time. Given that timing advance provided by the SCG has already been adjusted, the random access procedure should be one of the targets to be omitted in the quick recovery procedure.

Proposition 3: the RAN2 should agree that the random access procedure (access to the SCG) be eliminated from the quick MCG link recovery procedure irrespective of the above options.

For Option 1, the first step of the procedure is a cell re-selection processing. Because the SCG link is still in good condition and the timing advance is assumed to be valid, it is understood that the UE prioritizes the SCG (more precisely, the PSCell) in this processing. Thus, to minimize the interruption time, the cell re-selection processing is skipped. Instead, the UE only considers the PSCell as a result (i.e., target) of the cell re-selection processing.

Proposition 4: in a case where the RRC re-establishment procedure is extended (i.e., Option 1), the RAN2 should agree that the cell re-selection processing is omitted and the UE considers the current PSCell as a target for RRC re-establishment.

For Option 2, the NW has an occasion for initiating mobility control of the UE even after MCG RLF occurs (i.e., "T2" in FIG. 10). Such control should basically be performed in a "normal operation". In this sense, whether mobility control can also be performed before MCG RLF occurs (i.e., "T1" in FIG. 10) should be discussed. In a case where the Split SRB1 is configured, it is still possible to notify the MCG that the UE has detected a problem with the physical layer and is about to declare MCG RLF (i.e., T310 is in operation). This will allow the NW to easily immediate determine of handover to the SCG, the role change with the SCG, and the like. Thus, studying whether MCG failure is indicated during execution of T310 is valuable.

Proposition 5: the RAN2 should discuss whether MCG failure is indicated even during execution of T310, i.e., whether to indicate that the UE is about to declare MCG RLF to allow the NW to easily determine mobility control (e.g., immediate handover).

The invention claimed is:

1. A communication control method for controlling dual connectivity communication in which a user equipment is configured to connect to a master node associated with a master cell group (MCG) and connect to a secondary node associated with a secondary cell group (SCG), the communication control method comprising:
    transmitting, by the user equipment to the master node, capability information indicating that the user equipment supports recovery from MCG radio link failure (RLF) via a signaling radio bearer (SRB) established between the user equipment and the secondary node;
    receiving configuration information configuring the user equipment to transmit a first message for MCG link recovery to the secondary node in response to the MCG RLF,
    detecting, by the user equipment, the MCG RLF on a radio link between the master node and the user equipment;
    based on the received configuration information, transmitting, by the user equipment, the first message to the secondary node via the SRB established between the user equipment and the secondary node, in response to detecting the MCG RLF;
    starting a timer in response to transmission of the first message;
    performing RRC connection re-establishment processing in response to expiration of the timer; and
    transmitting, by the secondary node having received the first message, another message to the master node, the another message being used to recover the dual connectivity communication, wherein
    the first message includes a measurement result obtained by measuring a radio state between the user equipment and the master node and information indicating a type of the failure, and
    the type of failure includes problem of a random access.

2. The communication control method according to claim 1, further comprising:
    measuring, by the user equipment, a radio state with between the user equipment and the master node after transmitting the first message.

3. The communication control method according to claim 1, further comprising:
    receiving a handover command from the master node via the secondary node in response to the transmission of the first message.

4. The communication control method according to claim 1, wherein
    a value of the timer is configured for the user equipment by the master node or the secondary node.

5. The communication control method according to claim 1, further comprising:

stopping, by the user equipment, the timer in response to reception, from the secondary node, of a second message for recovery of communication with the master node while the timer is in operation.

6. The communication control method according to claim 1, further comprising:
after the master node receives the another message, transmitting and receiving an RRC message between the user equipment and the master node via the secondary node, with RRC connection being maintained between the user equipment and the master node.

7. The communication control method according to claim 1, wherein
the first message is a message requesting re-establishment of RRC connection.

8. The communication control method according to claim 1, wherein
the transmitting of the first message includes transmitting, by the user equipment, the first message while the user equipment omits transmission of a random access preamble to the secondary node.

9. The communication control method according to claim 1, wherein
the transmitting of the first message includes transmitting, by the user equipment, the first message while the user equipment omits a cell re-selection operation.

10. The communication control method according to claim 1, further comprising:
before the MCG RLF is detected, configuring, by the master node, for the user equipment, a threshold value for detecting the MCG RLF.

11. A user equipment configured for dual connectivity communication to connect to a master node associated with a master cell group (MCG) and connect to a secondary node associated with a secondary cell group (SCG), the user equipment comprising:
a processor and a memory, the processor configured to
transmit to the master node, capability information indicating that the user equipment supports recovery from MCG radio link failure (RLF) via a signaling radio bearer (SRB) established between the user equipment and the secondary node,
receive configuration information configuring the user equipment to transmit a first message for MCG link recovery to the secondary node in response to the MCG RLF,
detect the MCG RLF on a radio link between the master node and the user equipment,
based on the received configuration information, transmit the first message to the secondary node via the SRB established between the user equipment and the secondary node, in response to detecting the MCG RLF,
start a timer in response to transmission of the first message,
perform RRC connection re-establishment processing in response to expiration of the timer, and
transmit, by the secondary node having received the first message, another message to the master node, the another message being used to recover dual connectivity communication,
wherein
the first message includes a measurement result obtained by measuring a radio state between the user equipment and the master node and information indicating a type of the failure, and
the type of failure includes problem of a random access.

12. A chip set for a user equipment configured for dual connectivity communication to connect to a master node associated with a master cell group (MCG) and connect to a secondary node associated with a secondary cell group (SCG), the chip set comprising:
a processor and a memory, the processor configured to
transmit to the master node, capability information indicating that the user equipment supports recovery from MCG radio link failure (RLF) via a signaling radio bearer (SRB) established between the user equipment and the secondary node,
receive configuration information configuring the user equipment to transmit a first message for MCG link recovery to the secondary node in response to the MCG RLF,
detect the MCG RLF on a radio link between the master node and the user equipment,
based on the received configuration information, transmit the first message to the secondary node via the SRB established between the user equipment and the secondary node, in response to detecting the MCG RLF,
start a timer in response to transmission of the first message,
perform RRC connection re-establishment processing in response to expiration of the timer, and
transmit, by the secondary node having received the first message, another message to the master node, the another message being used to recover the dual connectivity communication, wherein
the first message includes a measurement result obtained by measuring a radio state between the user equipment and the master node and information indicating a type of the failure, and
the type of failure includes problem of a random access.

13. A non-transitory computer-readable medium comprising, stored thereupon, computer program instructions for execution by a user equipment configured for dual connectivity communication to connect to a master node associated with a master cell group (MCG) and connect to a secondary node associated with a secondary cell group (SCG), the program instructions being configured to cause the user equipment to execute processing of:
transmitting to the master node, capability information indicating that the user equipment supports recovery from MCG radio link failure (RLF) via a signaling radio bearer (SRB) established between the user equipment and the secondary node,
receiving configuration information configuring the user equipment to transmit a first message for MCG link recovery to the secondary node in response to the MCG RLF,
detecting the MCG RLF on a radio link between the master node and the user equipment,
based on the received configuration information, transmitting the first message to the secondary node via the SRB established between the user equipment and the secondary node, in response to detecting the MCG RLF,
starting a timer in response to transmission of the first message,
performing RRC connection re-establishment processing in response to expiration of the timer, and
transmitting, by the secondary node having received the first message, another message to the master node, the another message being used to recover the dual connectivity communication, wherein the first message includes a measurement result obtained by measuring a radio state between the user equipment and the master node and information indicating a type of the failure, and the type of failure includes problem of a random access.

14. A system comprising:

a user equipment configured for dual connectivity communication to connect to a master node associated with a master cell group (MCG) and connect to a secondary node associated with a secondary cell group (SCG), wherein the user equipment includes a processor and a memory, the processor being configured to:

transmit to the master node, capability information indicating that the user equipment supports recovery from MCG radio link failure (RLF) via a signaling radio bearer (SRB) established between the user equipment and the secondary node;

receive configuration information configuring the user equipment to transmit a first message for MCG link recovery to the secondary node in response to the MCG RLF, detect the MCG RLF on a radio link between the master node and the user equipment, based on the received configuration information, transmit the first message to the secondary node via the SRB established between the user equipment and the secondary node, in response to detecting the MCG RLF, start a timer in response to transmission of the first message;

perform RRC connection re-establishment processing in response to expiration of the timer, and transmit, by the secondary node having received the first message, another message to the master node, the another message being used to recover the dual connectivity communication, wherein the first message includes a measurement result obtained by measuring a radio state between the user equipment and the master node and information indicating a type of the failure, and the type of failure includes problem of a random access.

* * * * *